2,880,199

MANUFACTURE OF POLYOLEFINS

James L. Jezl, Swarthmore, Pa., assignor to Sun Oil Company, Philadelphia, Pa., a corporation of New Jersey No Drawing. Application November 2, 1956
Serial No. 619,934

4 Claims. (Cl. 260—93.7)

This invention relates to the preparation of polymers of normally gaseous olefins, and particularly relates to the preparation of solid polymers of ethylene, solid polymers of propylene, and solid copolymers of ethylene and propylene.

Normally gaseous olefins can be polymerized by a variety of catalysts. A catalyst which is especially effective for the polymerization of normally gaseous olefins to relatively high molecular weight, solid polymers is the combination of a lower chloride of titanium and an aluminum trialkyl, such as aluminum triethyl. This catalyst can be prepared by admixing, for example, titanium tetrachloride and aluminum triethyl in an inert liquid medium such as isooctane. On admixing the two components, a finely divided solid phase is formed as a dispersion in the inert, liquid medium. If desired, a lower halide such as titanium trichloride can be preformed, dispersed in an inert liquid, and an activator such as aluminum trialkyl added. This solid phase acts as a catalyst for polymerizing normally gaseous olefins to solid polymers. In performing the polymerization step, a normally gaseous olefin is contacted with the solid catalyst, such as by passing the olefin through a suspension of the finely divided solid in the inert, liquid reaction medium, and is thereby polymerized to solid polymers. Generally the polymerization reaction is continued until the polymer substantially fills the reactor, and/or embeds the catalyst particles so that the polymerization ceases. Other materials can be substituted for the aluminum triethyl, as hereinafter described. Anhydrous and oxygen-free conditions are used throughout the process, since the catalyst is deactivated by contact with water or oxygen.

However, in this process, the solid catalyst particles are intimately associated with, and dispersed throughout, the solid polymer product. The separation of polymer from catalyst is extremely difficult. Means heretofore described for separating catalyst from polymer involve grinding the polymer-catalyst in the presence of a catalyst-deactivating material such as water or alcohol to expose portions of the catalyst particles to the action of such deactivating and simultaneously or subsequently extracting the deactivated catalyst from polymer. This separation means is unsatisfactory in that the separation of polymer from catalyst requires that the catalyst be destroyed so that new catalyst is required for each polymerization.

An object of the present invention is to provide a process for the preparation of solid polymers of normally gaseous olefins in which the polymer is separated from catalyst without deactivating the catalyst. Other objects and their achievement in accordance with the process of the invention will be apparent hereinafter.

It has now been found that by subjecting an admixture of a solid polymer of a normally gaseous olefin and catalyst particles, as above described, to grinding in the presence of titanium tetrachloride maintained in the liquid phase, the catalyst particles are substantially completely dissolved in the titanium tetrachloride. Polymer free from catalyst and a solution of titanium trichloride in titanium tetrachloride are recovered. The titanium tetrachloride and titanium trichloride can be separated such as by distillation, if desired, and the titanium trichloride recycled to the process. If desired, all or a portion of the titanium tetrachloride can be subjected to reducing conditions to form additional titanium trichloride for use in the process.

Normally gaseous olefins and mixtures thereof are polymerized to solid polymers in the present process. Thus, ethylene is polymerized to solid polyethylene, propylene is polymerized to solid polypropylene, and mixtures of ethylene and propylene are polymerized to solid copolymers. The olefin, or mixture thereof, can be from any source, such as from petroleum refining operations, the dehydration of alcohols, or the like. Saturated hydrocarbons such as ethane or propane can be present in minor quantities and act as diluents. Oxygen and water must be absent from the feed stocks, as above explained.

The products of the process are solid polyethylene, solid polypropylene, or copolymers of ethylene and propylene, depending on the olefinic feed stock used. The polymers are substantially free from contamination by titanium-containing materials. The polyethylene polymers of the invention have molecular weights of above about 10,000, and generally from about 20,000 to 100,000. The density of the polyethylene varies from about 0.94 to 0.96 and the melting point from about 1.21° C. to 1.36° C. The polypropylene products of the invention generally have molecular weights above 50,000, and usually from about 75,000 to 500,000. The density of the polypropylene usually is from 0.91 to 0.93 and the melting point from about 160° C. to 175° C. Such solid polymers are useful for many purposes such as the for preparation of containers for corrosive liquids, for the preparation of conduits for transporting liquids, for the preparation of thin films for packaging materials and the like. Extrusion, molding, and other fabrication processes can be used in the preparation of such articles.

In an embodiment of the process of the invention, particles of titanium trichloride are dispersed in isooctane. A small quantity of aluminum triisopropyl is then added and propylene bubbled through the catalyst dispersion with agitation. When the catalytic activity has substantially decreased as indicated by lack of consumption of propylene, solids are separated from any excess isooctane such as by draining, and the admixture of polymer containing adhered and/or dispersed particles of titanium trichloride are comminuted in contact with titanium tetrachloride. The comminuting means should be such as to expose the catalyst particles to the liquid titanium tetrachloride, so that the catalyst particles are dissolved in the tetrachloride. The solution of titanium trichloride in titanium tetrachloride is then separated from the solid polymer, such as by draining or centrifuging. The solid polymer is then washed and dried by any desired means, such as with a saturated hydrocarbon followed by evaporation of the hydrocarbon. Titanium tetrachloride is readily distilled from titanium trichloride either at atmospheric or subatmospheric pressure, and the recovered titanium tetrachloride can be recycled to the process for dissolving additional catalyst.

The titanium trichloride catalyst used in the polymerization process of the invention can be prepared by any convenient means. A convenient means is to admix a solution of titanium tetrachloride in an inert liquid with an aluminum trialkyl such as aluminum triisopropyl. The aluminum triisopropyl serves to reduce the tetrachloride to the trichloride, and as the activating material. However, titanium trichloride can be prepared by prereduction of the tetrachloride by any convenient means such as by contacting with a dispersion of an alkali metal in an inert diluent, by contacting with hydrogen at a mildly elevated temperature, or the like. The titanium trichloride can be admixed with titanium dichloride, which is also a polymerization catalyst, and good results obtained.

Titanium trichloride in the solid phase, together with an activator, acts as a catalyst in the polymerization process, it being understood that a quantity of titanium dichloride can be present with the trichloride. The mole ratio of titanium trichloride to activator can be varied widely and good results obtained. A mole ratio of titanium trichloride to activator of from 1:10 to 10:1 gives good results.

Aluminum alkyls are preferred activators to employ, but other metal akyls, metal hydrides, metal borohydrides, and alkali metal hydrides can be used with good results. Suitable metal alkyls include alkyl derivatives of aluminum, zinc, beryllium, chromium, magnesium, lithium and lead. Aluminum triethyl, aluminum triisopropyl, aluminum triisobutyl, and the magnesium and zinc analogues thereof give good results in the process and are preferred, but metal alkyls having up to about 12 carbon atoms in the alkyl groups can be used with good results. Alkali metal alkyls such as n-butyllithium, methylsodium, butylsodium, phenylisopropylpotassium, and the like, also illustrate metal alkyls that give good results in the process. Metal borohydrides such as sodium borohydride and potassium borohydride illustrate the borohydrides which can be used. Alkyl metal halides which can be used are Grignard reagents such as methylmagnesium bromide, ethylmagnesium chloride, phenylmagnesium bromide, and the like.

The polymerization process is performed with a solid catalyst phase as a dispersion in an inert, liquid reaction medium. Inert liquids which can be used are preferably saturated hydrocarbons such as the pentanes, hexanes, heptanes, octanes, decanes, mixtures thereof and the like, or cycloparaffins such as the cyclopentanes, the cyclohexanes, or mixtures thereof with each other or with paraffins, and the like. The contacting of olefin with catalyst is performed under polymerizing conditions including a temperature within the range of from about 0° C. to 170° C. The pressure during polymerization does not appear critical and can be varied from about atmospheric to 5,000 p.s.i.g. (pounds per square inch gauge) with good results. Adequate time for the polymerization to proceed to a desired extent, or to completion, should be allowed, and such time will generally be within the range of from 0.5 to 12 hours.

After formation of the solid polymer, any excess liquid reaction medium is separated. The solid polymer, which contains particles of titanium trichloride, is then comminuted in contact with titanium tetrachloride. The comminuting can be performed by any convenient means, such as in a ball mill or like apparatus. Generally an excess of titanium tetrachloride is used. A volume of titanium tetrachloride, at least equal to the volume of the solid polymer, and preferably from 2 to 10 times the volume of the solid polymer, gives good results. The temperature of the mixture during the grinding step can be varied from about 10° C. to 136° C. with good results, and ambient temperature is conveniently used. On completion of the grinding step, the solution of titanium trichloride in titanium tetrachloride is removed from the polymer such as by draining. The polymer is then preferably washed with a saturated hydrocarbon to insure complete removal of the titanium tetrachloride, and dried such as by evaporation of any remaining hydrocarbon wash material. If desired, a water or alcohol washing step, with grinding means if desired, can be used after separation of the solution of titanium trichloride in titanium tetrachloride, to insure complete deactivation of any residual titanium compound in the polymer.

The following specific embodiment illustrates the process of the invention, in which "parts" refers to parts by weight. Into about 70 parts of n-heptane contained in a reactor were dispersed 1.65 parts of finely divided $TiCl_3$. 1.3 parts of aluminum triisobutyl were then added, with agitation, to the slurry of $TiCl_3$ in n-heptane. Propylene was introduced into the reactor to a pressure of 160 p.s.i.g., and the pressure was maintained at substantially this value by polymerization by periodic additions of propylene. During polymerization, constant agitation was provided and the temperature was maintained within the range of from 80° C. to 95° C. After 7.5 hours the run was stopped. The reaction product, consisting of solid polypropylene and dispersed $TiCl_3$ particles, was worked up by severe grinding in the presence of excess methanol, followed by refluxing in the presence of an excess of 10% concentrated nitric acid in isopropanol. The polymer was then repeatedly washed with methanol. A yield of 156.5 parts of polypropylene product having a molecular weight of 96,000 was obtained. The polymer contained up to about 0.1% of residual titanium.

The process is repeated except that instead of grinding in contact with methanol, the grinding is performed in contact with excess titanium tetrachloride at a temperature of 100° C. The volume of titanium tetrachloride employed is twice the volume of the solid polymer. A solution of titanium trichloride in the tetrachloride is formed. This solution is drained from the polypropylene and the polypropylene washed with n-heptane. The n-heptane is removed by evaporation and the recovered polypropylene is essentially the same polymer as above obtained, except that the quantity of residual titanium therein is smaller and is below about 0.01%. Titanium trichloride and titanium tetrachloride are separated by distillation. The recovered titanium trichloride is catalytically active and is returned to the polymerization step.

The invention claimed is:

1. In a process for the preparation of solid polymers of normally gaseous olefins wherein a normally gaseous olefin is contacted, under polymerizing conditions, with a dispersion of titanium trichloride and an activator selected from the group consisting of metal alkyls, metal hydrides, metal borohydrides and alkali metal hydrides in an inert, liquid reaction medium, whereby solid polymers of said normally gaseous olefin are formed, the improvement which comprises grinding said solid polymers in contact with an excess of liquid titanium tetrachloride at a temperature of from 10° C. to 136° C., and separating a solution of titanium trichloride in titanium tetrachloride from the solid polymer.

2. In a process for the preparation of solid polymers of normally gaseous olefins wherein a normally gaseous olefin is contacted, under polymerizing conditions, with a dispersion of solid particles of titanium trichloride and an activator selected from the group consisting of metal alkyls, metal hydrides, metal borohydrides and alkali metal hydrides in an inert, liquid reaction medium, whereby solid polymers of said normally gaseous olefin containing dispersed particles of titanium trichloride are formed, the improvement which comprises grinding said solid polymers in contact with an excess of liquid titanium tetrachloride at a temperature of from 10° C. to 136° C., separating a solution of titanium trichloride in titanium tetrachloride from the solid polymer, separating titanium tetrachloride from titanium trichloride, and returning the separated titanium trichloride to the polymerization step.

3. In a process for the preparation of solid polyethylene wherein ethylene is contacted, under polymerizing conditions, with a dispersion of solid particles of titanium trichloride and an activator selected from the group consisting of metal alkyls, metal hydrides, metal borohydrides and alkali metal hydrides in an inert, liquid reaction medium whereby solid polyethylene is formed, the improvement which comprises separating the so-formed solid polyethylene containing dispersed particles of titanium trichloride, grinding said separated polyethylene in contact with an excess of liquid titanium tetrachloride at a temperature of from 10° C. to 136° C., and separating polyethylene substantially free from titanium-containing material.

4. In a process for the preparation of solid polypropylene wherein propylene is contacted, under polymerizing conditions, with a dispersion of solid particles of titanium trichloride and an activator selected from the group consisting of metal alkyls, metal hydrides, metal borohydrides and alkali metal hydrides in an inert, liquid reaction medium whereby solid polypropylene is formed, the improvement which comprises separating the so-formed solid polypropylene containing dispersed particles of titanium trichloride, grinding said separated polypropylene in contact with an excess of liquid titanium tetrachloride at a temperature of from 10° C. to 136° C., and separating polypropylene substantially free from titanium-containing material.

References Cited in the file of this patent

UNITED STATES PATENTS

| | | |
|---|---|---|
| 2,560,164 | Garber | July 10, 1951 |

FOREIGN PATENTS

| | | |
|---|---|---|
| 533,362 | Belgium | May 15, 1955 |
| 538,782 | Belgium | Dec. 6, 1955 |